United States Patent Office 3,479,900
Patented Nov. 25, 1969

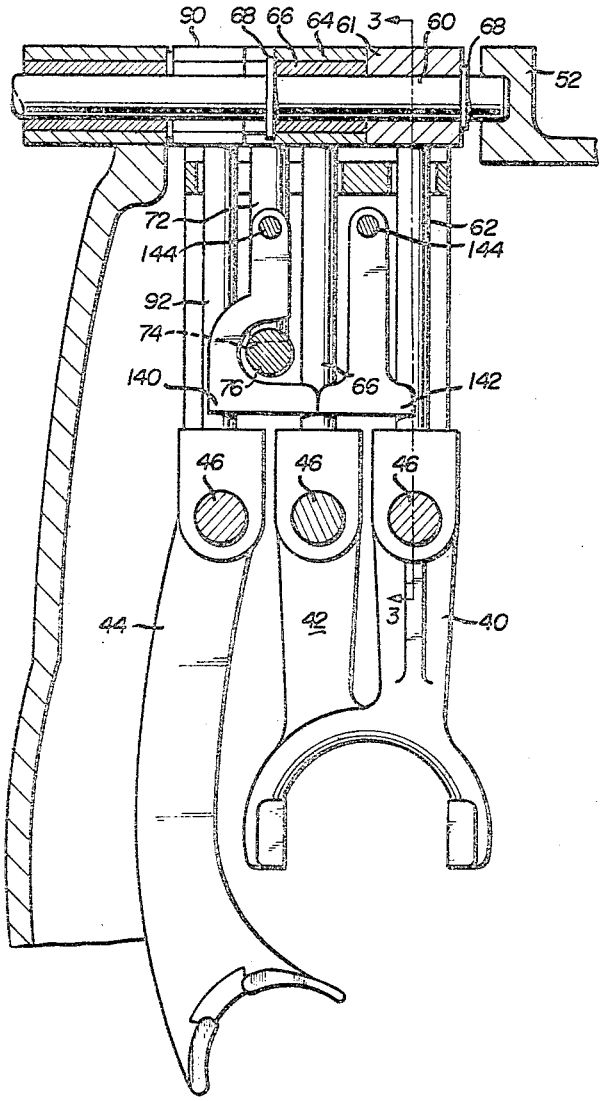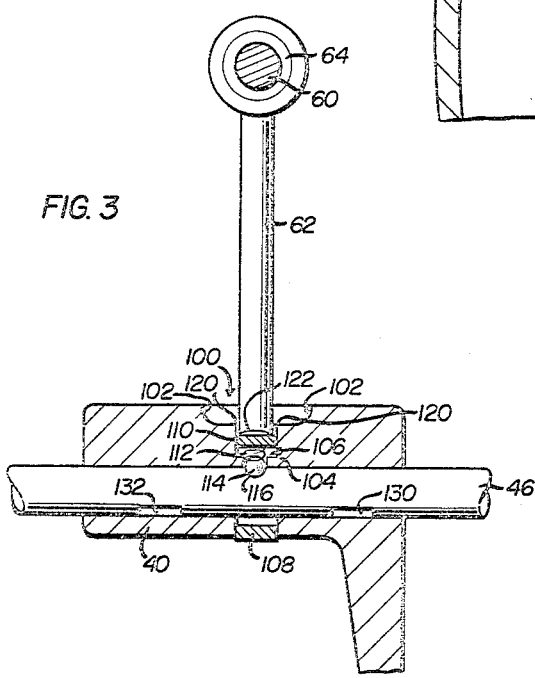

3,479,900
SLIDING GEAR SHIFTING MECHANISM
Vance H. Mays, South Euclid, Ohio, assignor to J. I. Case Company, Racine, Wis., a corporation of Wisconsin
Filed Feb. 1, 1968, Ser. No. 702,401
Int. Cl. G05g 5/10, 9/02
U.S. Cl. 74—477        14 Claims

ABSTRACT OF THE DISCLOSURE

A shifting mechanism for a transmission of the type which includes an input shaft, a countershaft and an output shaft with a selective interconnection between the input shaft and the countershaft for driving the countershaft at two different ranges relative to the input shaft. The transmission further includes a plurality of shiftable gears for selectively connecting the countershaft to the output shaft thereby establishing a plurality of forward speeds and a reverse speed. A plurality of shifting forks are designed to engage and disengage the respective gears with an individual control for each of the forks and lock means for maintaining the forks in engaged position. A positive interlock is provided between the respective controls so that when any of the forks is in engaged position, the remaining control means are locked in the neutral position. The shifting mechanism also includes a provision incorporated therein for selecting the range of the transmission.

Background of the invention

The present invention relates to a shifting mechanism for a multi-speed, multi-range transmission and more particularly to a simple and improved control mechanism for selectively shifting any one of a plurality of forks and locking the remaining forks in the neutral position when any of the other forks is in the engaged position.

Transmissions normally employed in heavy duty vehicles, such as agricultural and light industrial tractors, often require that the transmission be capable of being operated at a plurality of fixed ground speeds. At the same time, it is desirable to have a transmission that will produce a relatively high transport speed for operation of the tractor on highways and on other good roads.

One type of transmission which has found remarkable success includes an arrangement wherein a dual-range means is provided for driving a countershaft from an input shaft at either high or low ranges and second means are provided in the transmission for driving the output shaft at any one of a plurality of speeds relative to the countershaft. In actual practice, this type of transmission has generally been designed to be capable of producing eight forward speeds and two speeds in reverse.

This is accomplished by utilizing a shifting mechanism which is capable of actuating the dual-range means to drive the countershaft at either of the two speeds relative to the input shaft and to provide two sets of slidable gears carried by the countershaft and selectively engageable with four gears rotated with the ouptut shaft. The reverse speed is produced by engaging a fifth gear carried by the countershaft with an idler gear in mesh with a fifth gear rotatable with the output shaft.

Various types of control means have been proposed for moving the respective sliding gears into and out of engagement with the fixed gears carried by the output shaft. Most of these devices or control mechanisms required a certain sequence of shifting the respective gears between various speed ratios. Thus, most of the devices known to applicant include a shifting mechanism which must engage and disengage selected gears in a definite sequence. For example, if an operator of a vehicle desires to shift from the fourth speed down to the first speed of the multi-speed transmission, he must pass through the third and second speed shifting sequence. This arrangement is not only time consuming but in many instances is very irritating to the operator.

Summary of the invention

According to the present invention, a simple and effective shifting mechanism is provided which is capable of allowing the operator to shift the multi-speed transmission into any one of a plurality of speeds from a neutral condition. Furthermore, the shifting mechanism includes means for conditioning the transmission for either high or low range operation and an unique interlock is provided so that when the multi-speed transmission is in any one of its selected speeds, the remaining actuating members are locked in the neutral position.

Thus, the primary object of the present invention is to provide a simple and inexpensive shifting mechanism for a multi-speed, multi-range transmission.

Another object is to provide a control mechanism for a transmission of the above type in which individual control means are provided for each of the shiftable members of the transmission and a unique interlock is interposed between the respective control mechanisms.

Other objects and advantages of the invention will become apparent in the following description and the accompanying drawings.

On the drawings:

FIGURE 3 is a sectional view taken along lines 3—3 of FIGURE 4;

FIGURE 4 is a vertical sectional view taken generally along lines 4—4 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein for the purpose of description and not of limitation.

Figure 1:
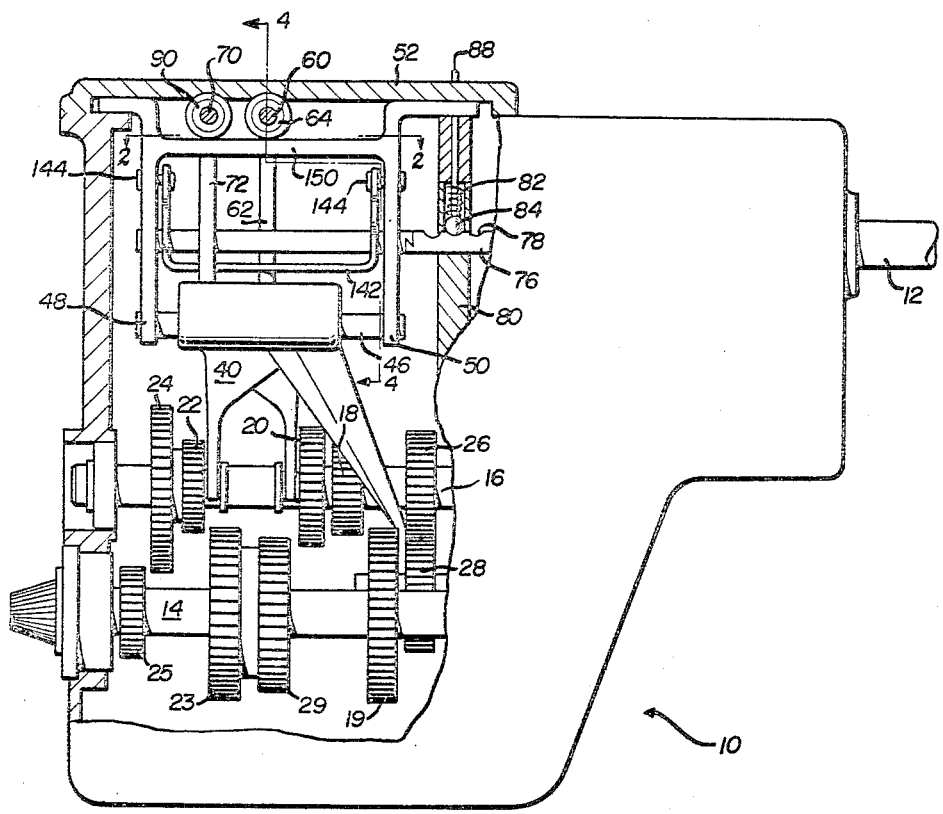
FIGURE 1 is a fragmentary schematic view partially in section of a transmission incorporating the shifting mechanism of the present invention.

As shown on the drawings:

FIGURE 1 of the drawings shows a transmission having an input shaft 12, an output shaft 14 with a plurality of gears and a countershaft 16 interposed between the input and output shaft. The countershaft 16 is operatively connected through a dual-range mechanism (not shown) to thus drive the countershaft at two different ranges of speed relative to the input shaft.

The countershaft 16 has a first pair of sliding gears 18 and 20 mounted for rotation with the countershaft and adapted to be selectively engaged with individual gears 19 and 21 carried by the output shaft 14. A second set of gears 22 and 24 are likewise slidably received on the countershaft and are interconnected to be rotated therewith. These gears likewise are adapted to be selectively engageable with gears 23 and 25 fixed on the output shaft. A fifth gear 26 is also mounted for rotation on countershaft 16 which is in constant mesh with an idler gear 28 which is slidable to mesh with a gear (not shown) carried by the output shaft to thus rotate the output shaft 14 in the same direction as the countershaft 16 to produce the reverse gear.

The respective gears are adapted to be moved by a plurality of shifting forks 40, 42 and 44 each of which is slidable on a separate shaft 46 mounted in spaced parallel relationship on dependent portions 48 and 50 carried by a cover 52 forming part of the housing of the transmission.

According to the invention, individual means are provided for shifting each of the forks along the respective shafts 46 to thereby move the sliding gears associated therewith between engaged and neutral positions. The shifting or actuating means includes a first shaft 60 mounted for rotational movement in the housing 52 and disposed transversely of the axis of the respective shafts 46. The shaft 60 has a finger or actuating member 62 fixedly secured thereto by a bushing 61 to rotate therewith. A tubular member or hollow shaft 64 is rotatable on the shaft 60 and also has a fixed finger 66 depending therefrom to engage and move the fork 42. An antifriction member 66 is preferably interposed between shafts 60 and 64 and the hollow shaft is limited to rotational movement by spaced snap rings 68 carried by the shaft 60.

The means for actuating the dual-range between low, neutral and high positions includes a shaft 70 substantially identical to shaft 60 and mounted in the same manner within the housing cover 52 to be limited to rotational movement. The shaft 70 also has a depending finger or actuating member 72, the lower end of which is received in a recess 74 (FIGURE 4) defined on an actuating shaft 76. The shaft 76 has three axially spaced arcuate recesses 78 aligned with a vertical support portion 80 which slidably receives the shaft 76 in an opening therein. The recesses are located to correspond to the low, neutral and high positions of the actuating shaft 76.

An opening 82 is formed in the member 80 and extends substantially perpendicular to the axis of the shaft 76. A ball 84 is received in the opening and is spring biased into engagement with any one of the several recesses 78 which may be aligned therewith. A rod 88 may be slidably carried by the member 80 and cooperate with the power source (not shown) to lock the shaft in the neutral position whenever the power source is shut down.

The shaft 70 also has a hollow tubular member or shaft 90 limited to rotational movement thereon and carries a finger or actuating member 92 having the free end thereof in engagement with the fork 44 which in turn is adapted to move the idler gear between engaged and neutral positions.

According to one aspect of the invention, unique means are provided for cooperating between the respective actuating members or fingers and the forks. Also, each of the forks includes locking means for maintaining the forks in a locked condition in the engaged positions thereof. Furthermore, the actuating means including the respective actuating shafts and the actuating fingers cooperate with the forks and with additional interlocking means, to be described later, to automatically lock the remaining two forks in the neutral position whenever the third fork is in an engaged position.

The cooperating means between the respective fingers or actuating members and the forks is shown in connection with the shifting fork 40 and the actuating finger 62 in FIGURE 3. It is to be understood that the remaining two forks have similar means for cooperating with the respective fingers to allow the fingers to move the respective forks.

Thus, the fork 40 has an elongated recess 100 formed in the upper portion thereof at approximately the center of the fork. The opposite ends of the recess 100 have camming surfaces 102 defined thereon which cooperate with the actuating member 62, as will become apparent hereinafter. The recess 100 is in open communication with a slot 104 in which the locking means 106 is guided for movement.

The locking means 106 includes a U-shaped locking clip 108 which encircles the shaft 46. The free ends of the legs of the clip 108 are interconnected by a base member 110 which is vertically slidable in slot 104 and the clip 108 and base member 110 are spring biased into engagement with the lower portion of the shaft 46. This is accomplished with a spring 112 having one end in engagement with a ball 114 that is received in a recess 116 defined on the upper edge of the shaft 46 when the actuating fork is in the neutral position.

The end of the actuating member or finger 62 is received in the slot 104 and depresses the locking means 106 to the position shown in FIGURE 3 when the fork 40 is in the neutral position. As can readily be appreciated from an inspection of FIGURE 3, clockwise or counterclockwise rotation of the shaft 60 will move the free end of the actuating member along a rising and falling arc defined by the length of the finger. Thus, for example, counterclockwise rotation of the shaft 60 will first cause the lower end of the finger 62 to engage the right wall of the slot 104 and will move the fork rightwardly as viewed in FIGURE 3. After a predetermined amount of movement, the end of the actuating finger will be in approximate alignment with the edge or corner 120 defined between the recess 100 and the slot wall 104. In order to have the finger 62 move across this corner without increasing the necessary force on the rotation of the shaft, the lower end of the finger 62 is provided with an arcuate recess 122 so that when the lower edge of the finger moves past the corner 120 the entire lower end of the finger is capable of being moved past this corner into engagement with the arcuate surface 102 to provide for additional movement of the fork on the continued counterclockwise rotation of the finger 62.

Of course, once the free end of the actuating member 62 moves out of the elongated slot 104, the action of the spring 112 will cause the clip 108 to be moved upwardly with the lower portion thereof in engagement with the lower edge of the shaft. When the actuating fork is in a position corresponding to the engaged position of the gear associated therewith, the clip 108 will be received in a notch 130 defined on the shaft 46. This will positively lock the fork in this position and the unique locking means will be capable of resisting large disengaging forces from the respective intermeshing gears with a small amount of spring force.

Of course, if it is desired to move the fork from the engaged to the neutral position, the shaft 60 is rotated in the opposite direction. The few degrees of rotation will cause the actuating finger to be received into the slot 104 thus depressing the locking means 106 sufficiently to remove the clip 108 from the notch 130. Thereafter, continued movement of the actuating member 62 will move the fork to the neutral position shown in FIGURE 3. This position can readily be appreciated by the operator when the ball 114 is received in the recess 116. Of course, the movement of the actuating finger in the opposite direction or leftward as viewed in FIGURE 3 will cause the fork to move in the opposite direction and have the clip 108 received in the notch 132 defining the second engaged position of the fork 40 corresponding to the second engaged position of the gears associated therewith.

According to another aspect of the invention, improved interlocking means are provided for locking two of the forks in the neutral position whenever the third fork is in the engaged position. This interlocking means comprises a pair of substantially U-shaped members 140 and 142 cooperating with the respective actuating members which are received through slots in the horizontal wall 150 interconnecting the members 48 and 50. The U-shaped members or gates 140 and 142 are pivotally mounted on the respective legs 48 and 50 by pins 144.

The gate 140 has a recess 152 disposed in alignment with the actuating finger or member 92. A second recess 154 defined on an opposed surface of gate 140 is in alignment with the actuating member 66. The U-shaped member or gate 142 has a pair of recesses 156 and 158 formed on the opposite edges of the base portion thereof and in transverse alignment with each other and also in alignment with the respective actuating members 62 and 66 and the recess 154, for a purpose to become apparent hereinafter.

The member 150 has an elongated slot 170 in which the actuating member is guided for movement. A second elongated slot 172 has the actuating member 66 extending therethrough while a third slot 174 receives the actuating finger 92. A fourth slot 176 is also provided for receiving the actuating member 72 cooperating with the high low range shifting mechanism.

The U-shaped members or gates 140 and 142 are dimensioned and mounted on the members 48 and 50 in a manner so that the recesses 152 through 158 cooperate with the respective actuating members 62, 66 and 92 to lock the remaining actuating members in a neutral position when any one of the actuating members is in engaged position. Thus, for example, if the actuating member or finger 62 is moved from the position shown in FIGURE 2, the member 62 will be moved out of the recess 158 pivoting the gate 142 sufficiently on pins 144 to cause the recess 156 to engage a portion of the actuating member 66. Since the gate or U-shaped member 140 is in contact with the opposite side of the gate 142 through extensions 190, this gate will also be pivoted on the pivot points 144 to move the recess 152 into engagement with the actuating member 92. Since the respective actuating members are limited to movement longitudinally of axes of the respective slots in the member 150, the recesses in the gates will lock the respective actuating members in the neutral position whenever any one of the actuating members is in engaged position. Thus, considering just the two actuating members 62 and 66, when actuating member 62 is in the engaged position, the members 66 and 92 are in engagement with the respective walls of the recesses 156 and 152 to lock the actuating members 66 and 92 in the neutral position. Of course, by locking the actuating members 66 and 92 in the neutral position, the fork associated therewith is likewise locked in the neutral position.

Figure 2:
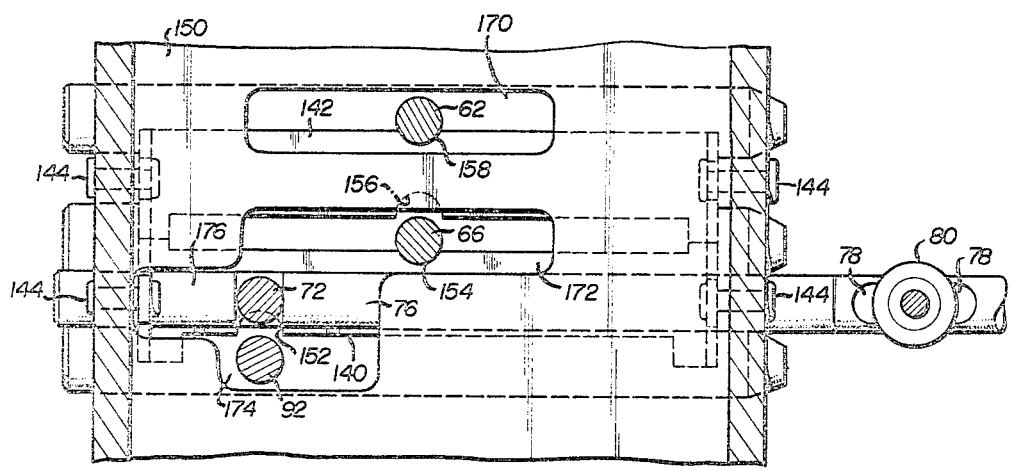
FIGURE 2 is a sectional view taken generally along lines 2—2 of FIGURE 1.
Figure 5:
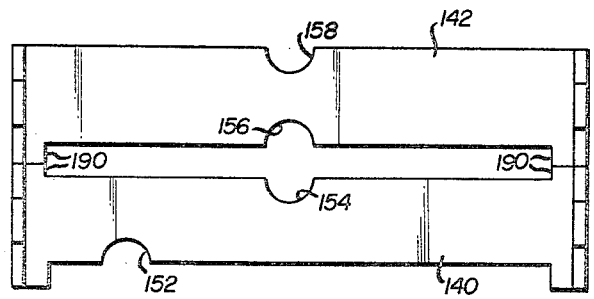
FIGURE 5 is a plan view of one of the elements of the shifting mechanism shown in FIGURE 1.

Likewise, when the actuating finger 92 is moved from the position shown in FIGURE 2, the finger will engage the adjacent edge of the base portion of gate 140 to lock the fingers or elements 62 and 66 in their respective recesses. It should be noted that the juxtaposed edges of the gates 140 and 142 are both engaged by the actuating element 66 when this element is moved from the neutral position, shown in FIGURE 2. This will separate the two gates sufficiently to force the recesses 152 and 158 into contact with the respective fingers 92 and 62 to lock both fingers in the neutral position.

The range selector shaft 76 does not cooperate with the interlock means or gates 140, 142 so that the range may be changed regardless of the position or engagement of any of the forks. This will double the ratio settings between the input and output shafts since the range selector may be set at low or high when any of the forks is in engaged position.

As can be readily appreciated, the invention provides a simple and efficient interlock between a plurality of shifting forks while utilizing an independent control for each fork. Furthermore, each fork is independently locked in the engaged position and is capable of withstanding extreme gear disengagement forces with a relatively small spring force.

While one exemplary embodiment of the invention has been described in detail, it will be apparent to those skilled in the art that the disclosed embodiment may be modified.

I claim:
1. A shifting mechanism for a multi-speed transmission having a housing supporting gear means movable between engaged and neutral positions by at least two forks slidably guided along predetermined paths on fixed guide shafts and means for moving said forks, the improvement of said means including first and second independently pivotable actuating members respectively engaging one of said forks for moving the associated fork between engaged and neutral positions, and interlock means on said housing and cooperating with said actuating members to lock one of said forks in the neutral position when the other of said forks is in the engaged position.

2. A shifting mechanism as defined in claim 1, in which said actuating members each include a rotatable shaft disposed transversely of said guide shaft and a finger carried by each of said rotatable shafts, said fingers each having a free end engaging one of said forks for moving the associated fork along the guide shaft.

3. A shifting mechanism as defined in claim 2, in which said rotatable shafts are concentrically disposed and means limiting said shafts to rotational movement whereby rotational movement of one of said rotatable shafts will move the associated fork between neutral and engaged positions.

4. A shifting mechanism as defined in claim 1, in which each of said forks has locking means engaging the associated guide shaft in the respective engaged positions of said fork to lock the fork on the guide shaft when the fork is in an engaged position.

5. A shifting mechanism as defined in claim 1, wherein said transmission includes three shifter forks the further improvement of a third actuating member cooperating with the third shifter fork and said interlocking means cooperating with said actuating members to lock two of said forks in the neutral position when the third of said forks is in an engaged position.

6. A shifting mechanism as defined in claim 1, wherein the transmission includes three forks each supported on guide shafts for selectively setting the speed of said transmission and a range selector adapted to selectively drive an output shaft at at least two ranges relative to the input shaft, the further improvement of a third independently movable actuating member engaging the third of said forks, a range shaft connected to said range selector and a fourth independently movable actuating member cooperating with said range shaft for setting the range of said transmission.

7. A shifting mechanism as defined in claim 6, in which each of said actuating members includes a rotatable shaft with pairs of said shafts being concentric and rotatable in opposite directions to selectively move said forks and range selector between neutral and engaged positions.

8. In a transmission having a housing supporting gear means interposed between an input and an output shaft with a pair of forks slidable on a pair of guide shafts, said forks being movable between engaged and neutral positions for selectively engaging said gear means to drive said output shaft at a plurality of speeds relative to said input shaft, the improvement of means for moving said forks between neutral and engaged positions, said means comprising a pair of concentric actuating shafts rotatable in opposite directions, actuating means carried by each of said actuating shafts and engaging one of said forks, and locking means carried by each of said forks for releasably locking the associated fork in engaged position on a guide shaft, said actuating means adapted to release the locking means associated therewith and thereafter move said fork from the engaged to the neutral position.

9. A transmission as defined in claim 8, including the further improvement of interlocking means to lock one of said forks in the neutral position when the other of said forks is in the engaged position, said interlocking means comprising a pivoted gate having means engaging a portion of one of said actuating means when the other actuating means is moved from the neutral position.

10. A transmission as defined in claim 8, in which said locking means comprises a biased clip guided in said fork and means on said guide shaft receiving said clip when the associated fork is in engaged position, said actuating means coacting with said clip to maintain the clip in released position when the associated lock is moved from the engaged position.

11. A shifting mechanism for a sliding gear transmission having a plurality of shifting forks movable between neutral and engaged positions on fixed longitudinal guide means comprising a first actuating finger limited to movement in a single plane axially of said guide means for moving a first of said shifting forks between neutral and engaged positions, a second actuating finger limited to movement in a single plane axially of said guide means for moving a second of said forks between neutral and engaged positions, actuating means for independently moving said fingers and a pivoted gate having cooperating means interposed between said first and second fingers for locking one of said fingers in a position corresponding to the neutral position of the associated fork when the other of said fingers is in a position corresponding to the engaged position of the associated fork.

12. A shifting mechanism as defined in claim 11, further including a third actuating finger for moving a third of said forks between neutral and engaged positions, actuating means for moving said third finger axially of said guide means and a second pivoted gate cooperating with the first gate and said actuating fingers for locking the third finger in a position corresponding to the neutral position of the third fork when either of the first and second forks is moved from a position corresponding to the neutral position of the associated fork.

13. A shifting mechanism as defined in claim 11, in which cooperating means includes a longitudinal base portion defining spaced edges with said edges having a recess for each of said actuating fingers.

14. A shifting mechanism as defined in claim 11, including the further improvement of locking means cooperating between each of said forks and said guide means, said locking means each including a biased element carried by the fork, said actuating fingers maintaining said biased element in an inoperative condition when the associated fork is in a neutral position and allowing the biased element to cooperate with said guide means to lock the fork in an engaged position.

References Cited
UNITED STATES PATENTS

| | | | |
|---|---|---|---|
| 1,120,157 | 12/1914 | Parker | 74—477 |
| 1,434,643 | 11/1922 | Woolson | 74—477 |
| 2,402,842 | 6/1946 | Rhodes | 74—475 |
| 3,264,894 | 8/1966 | Popovich et al. | 74—477 |
| 3,292,451 | 12/1966 | Jacklin et al. | 74—477 |
| 3,301,078 | 1/1967 | Michael | 74—477 X |

MILTON KAUFMAN, Primary Examiner

U.S. Cl. X.R.

74—475